May 8, 1934.　　　　N. C. STOREY　　　　1,957,917
TRACTOR
Filed June 17, 1930　　　4 Sheets-Sheet 3
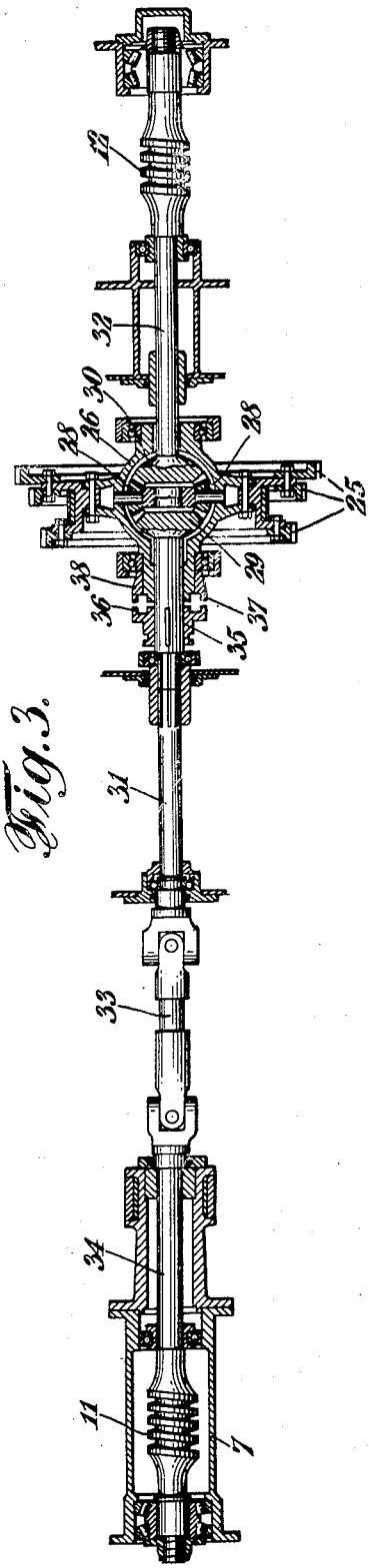
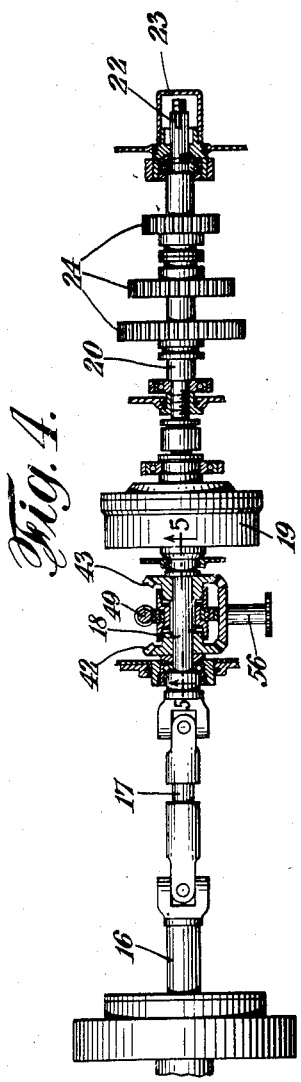
INVENTOR
Norman C. Storey
BY
ATTORNEYS May 8, 1934.  N. C. STOREY  1,957,917
TRACTOR
Filed June 17, 1930  4 Sheets-Sheet 4
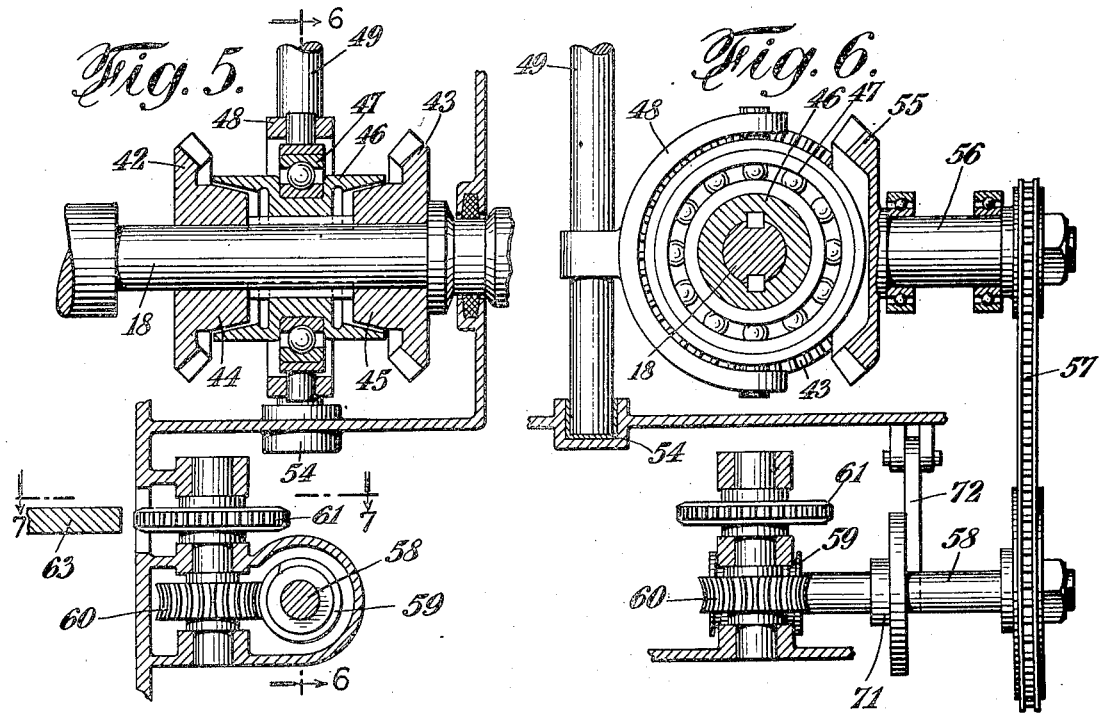
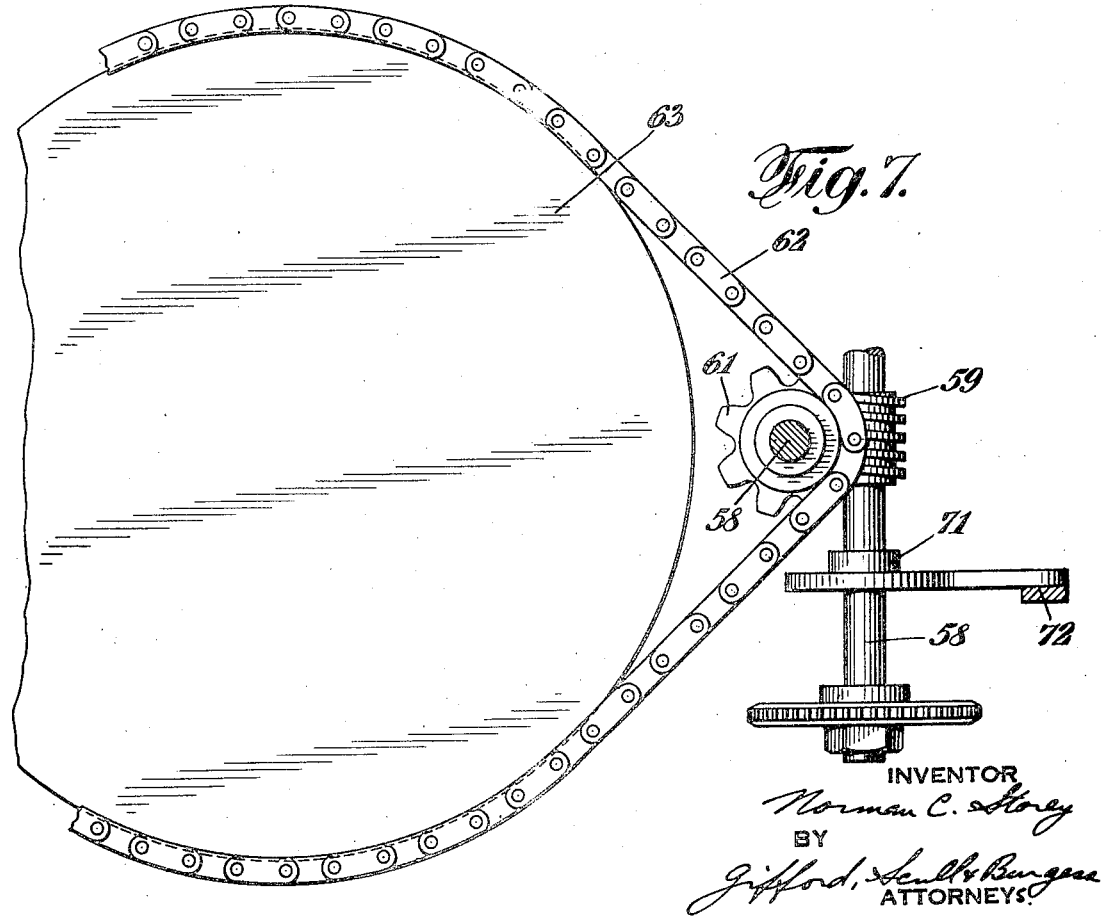
INVENTOR
Norman C. Storey
BY
Gifford, Scull & Burgess
ATTORNEYS Patented May 8, 1934

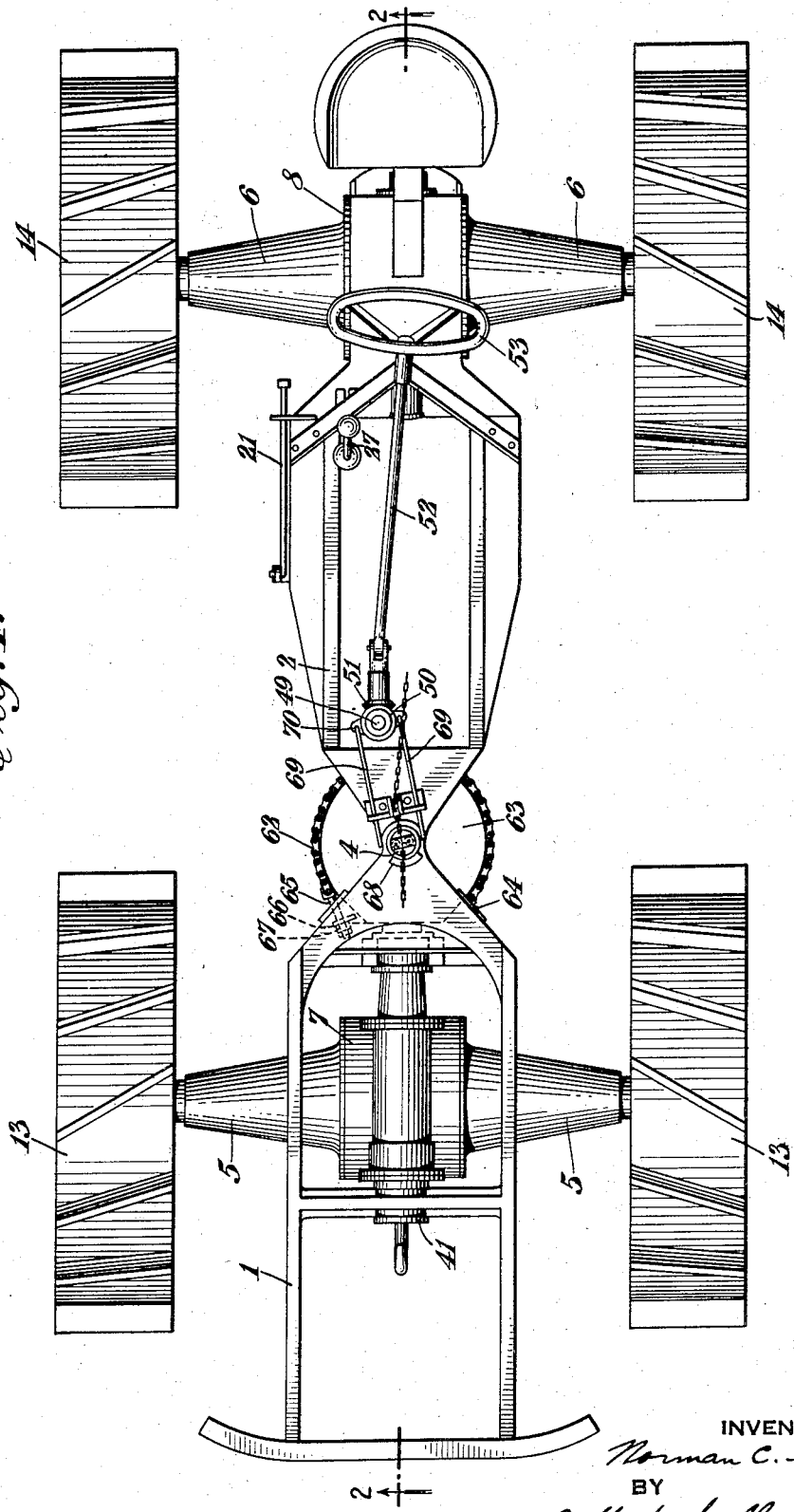

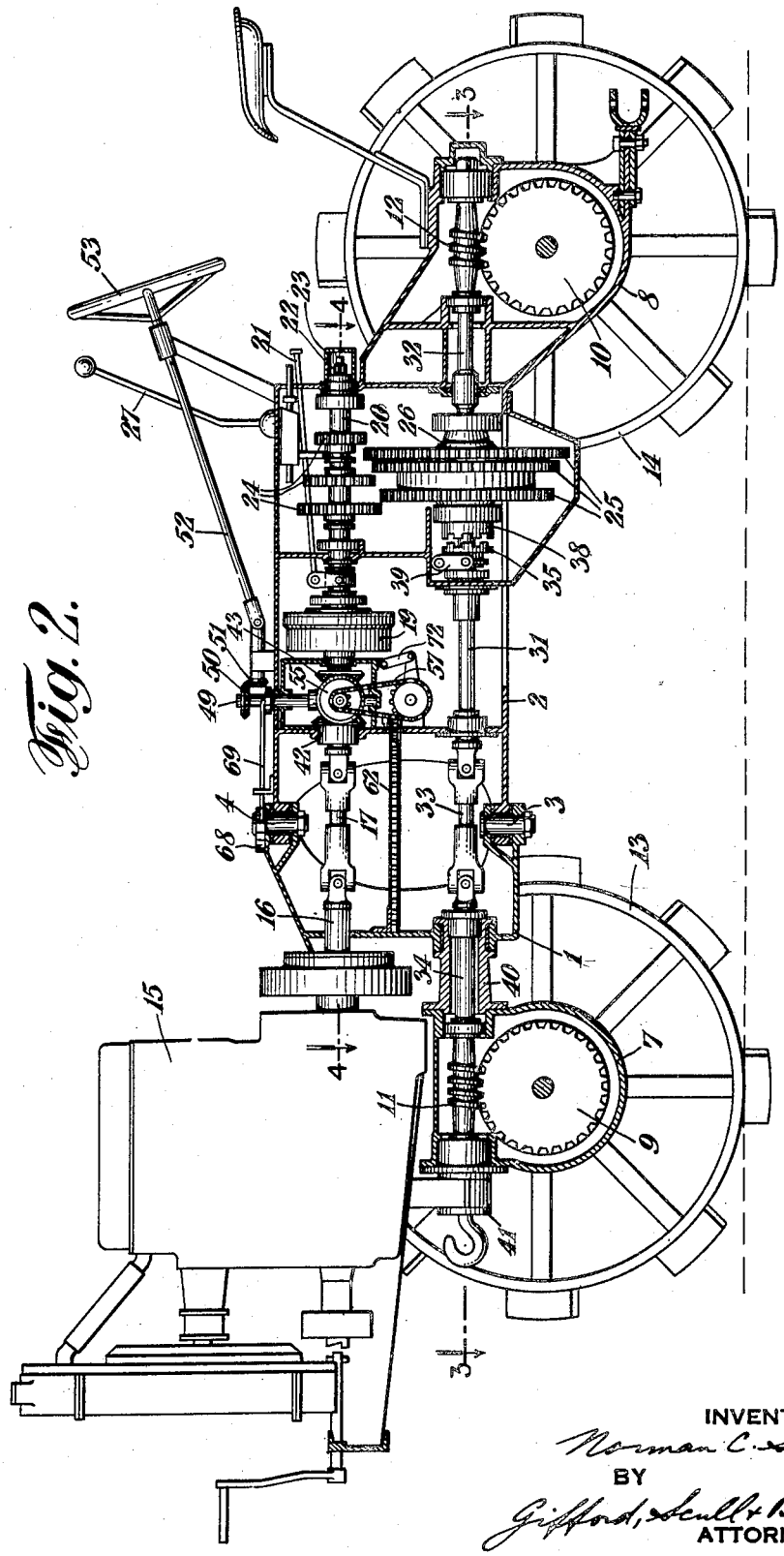

1,957,917

UNITED STATES PATENT OFFICE 1,957,917

TRACTOR

Norman C. Storey, Clewiston, Fla.

Application June 17, 1930, Serial No. 461,691

3 Claims. (Cl. 180—49)

My invention relates to a novel and improved form of tractor, the novel features of which will be best understood from the following description and the annexed drawings, in which I have shown a selected embodiment of the invention, and in which:—

Fig. 1 is a plan view of a tractor with the motor removed;

Fig. 2 is a vertical section approximately on the line 2—2 of Fig. 1;

Fig. 3 is a section on the line 3—3 of Fig. 2;

Fig. 4 is a view on the line 4—4 of Fig. 2;

Fig. 5 is a section on the line 5—5 of Fig. 4;

Fig. 6 is a section on the line 6—6 of Fig. 5;

Fig. 7 is a section on the line 7—7 of Fig. 5.

Referring particularly to Figs. 1 and 2, the tractor comprises a frame having a front section 1 and a rear section 2 joined together by a vertical pivot here shown as formed of pins 3 and 4, it being understood that these pins are vertically in alignment so as to form, in effect, one vertical pivot.

The front section of the frame carries the axle housings 5, while the rear section carries the axle housings 6, it being understood that the axles in these housings are operatively connected by means of suitable differentials contained respectively in the housings 7 and 8. Since the details of these differentials are well known in the art, they are not further illustrated herein. The differentials are operated by means of worm gears 9 and 10, respectively, these gears meshing with worms 11 and 12, the operation of which will be more fully described presently.

The front section of the frame is supported on two front wheels 13, and the rear section on two wheels 14, and novel means is provided for driving both sets of wheels. This means is operated from a motor 15 supported on the front section 1 and having a shaft 16 extending rearwardly therefrom. This shaft has a universal joint 17 connecting it to a shaft 18 on the rear section, it being noted that the joint is so disposed with respect to the pivot connecting the frame sections that the shaft 18 will always be rotated, regardless of the position of the sections with respect to each other.

The shaft 18, which may be termed the driving shaft, terminates in a clutch, the housing of which is designated 19 and which connects the shaft 18 to a driven shaft 20. The clutch may be of any usual construction, and may be operated by a lever 21. The end of the shaft 20 is indicated at 22 in Fig. 4, and is intended for use as a power outlet, and when not in use as such, it is covered by a cap 23.

Slidably mounted on the shaft 20, are transmission gears 24 adapted to mesh with gears 25 on a differential housing 26, this housing having an axis parallel to the shaft 20. The gears 24 may be shifted by means of a lever 27 in order to obtain various gear ratios to govern the transmission between the shaft 20 and the differential housing 26.

The housing 26 has mounted therein two planetary pinions 28 meshing with bevel gears 29 and 30 secured respectively to shafts 31 and 32 which are disposed in alignment with each other. The shaft 32 carries the worm 12 meshing with the worm gear 10, while the shaft 31 is connected by the universal joint 33 to the shaft 34 carrying the worm 11 meshing with the worm gear 9. By this arrangement, the motion transmitted to the differential housing 26 is communicated to the shafts 31 and 32, and the differential provides a flexible connection permitting the shafts to rotate at different speeds with respect to each other.

Splined on the shaft 31 is a collar 35 having clutch elements 36 adapted to cooperate with corresponding clutch elements 37 on a collar 38 secured to the housing 26. The collar 35 may be operated by a lever 39 which, in turn, may be actuated by any suitable means (not shown) to bring the clutch elements 36 and 37 into and out of engagement. When they are in engagement, the collar 35 and, consequently, the shaft 31 are positively connected to the differential housing, locking the pinions 28 against rotation on their own axes and therefore rotation of the differential housing is transmitted directly to the shaft 31 and through the locked differential to the shaft 32. This is of advantage where the wheels are slipping.

The front section 1 is supported on the front wheels by means of longitudinally extending bearings 40 and 41 which, with the universal joints, permits side tipping of the front wheels in a manner similar to what is disclosed in my Patent No. 1,623,214.

Between the motor and the clutch 19, I provide a steering mechanism together with means for connecting the mechanism to the motor so that it will be power-driven. This mechanism is best shown in Figs. 1, 2, 5, 6, and 7. Referring to these figures, it will be seen that the shaft 18 has rotatably mounted thereon a pair of bevel gears 42 and 43, each having a cone-shaped clutch element 44 and 45 facing each other, with the small ends of the cones adjacent.

Keyed to the shaft 18, between the cones 44 and 45, is a clutch element 46 having cone-shaped surfaces adapted to cooperate respectively with the cones 44 and 45. This clutch element has a bearing in a collar 47 which is pivoted to a yoke 48, this yoke being operated by the rotation of a vertical spindle 49. This rotation of the spindle 49 may be caused by mechanism indicated in Fig. 2 and comprising a bevel gear 50 meshing with a gear 51 operated through a shaft 52 by a steering gear 53 (see also Fig. 1). The yoke may be supported on a suitable bearing 54, as shown in Fig. 6.

The gears 42 and 43 are in constant mesh with a gear 55 mounted on a shaft 56 carrying a sprocket which, through a chain 57, drives a sprocket on a steering shaft 58. Therefore, when the element 46 is brought into engagement with either of the corresponding cones 44 or 45, the gear 55 will be rotated, the direction of rotation depending upon whether the gear 42 or 43 is rotated by the clutch element 46. This rotation of the gear 55 is used to operate the steering mechanism by rotation of the steering shaft 58 which has mounted thereon a worm 59 meshing with a worm gear 60 on a shaft carrying a sprocket 61. This sprocket engages a chain 62 engaging a guide or disc 63 on opposite sides thereof, as best shown in Figs. 1 and 7.

The disc 63 is concentric with the pivot exemplified by the pins 3 and 4, and the mechanism for operating the chain 62 is mounted on the rear section 2 of the frame. The opposite ends of the chain 62 are secured to the front section 1 of the frame on opposite sides of the pivot between the sections, one end being shown as rigidly secured to the front section as at 64, and the other end may be secured to the other side of the frame by means of a bolt 65 passing through a lug 66 and secured in place by a nut 67 whereby the chain may be adjusted.

By the arrangement just described, it will be seen that by movement of the steering wheel 53, the clutch element 46 will be thrown into engagement with either the cone 44 or 45 which, in turn, will cause movement of the chain 62 around the disc 63 to move the front section 1 about its pivot with respect to the rear section. In order to limit the extent of this movement, I provide a lug 68 (best shown in Fig. 1) which is adapted to engage either one of the stop rods 69 which are pivoted in ears 70 of a collar secured to the shaft 49 whereby, when the lug 68 engages one of these rods, it will cause rotation of the shaft 49 to return the clutch element 46 to a neutral position. In this position, the clutch element will be normally held by means of a friction brake 71 held in position by a link 72.

While I have shown the invention as embodied in a specific form, it is to be understood that various changes in details may be made without departing from the scope of the invention, and I therefore do not intend to limit myself except by the appended claims.

I claim:

1. In a motor-driven tractor having front and rear sections, each carrying a pair of wheels and pivoted together on a vertical pivot disposed between said pairs of wheels and having a motor on one of said sections driving said pairs of wheels through connections including a shaft having a universal joint so disposed with respect to said pivot that the driving connections are not disturbed by pivotal movement of the sections about said pivot; a member secured to one of said sections and disposed concentrically to said pivot, a steering shaft on the other of said sections and having means to move said member about the axis of said pivot and thereby to cause a pivotal movement of one section with respect to the other, a connection from said motor to said steering shaft comprising normally inoperative clutches adapted to rotate said steering shaft in opposite directions, and means to render either one of said clutches operative.

2. In a motor-driven tractor having front and rear sections, each carrying a pair of wheels and pivoted together on a vertical pivot disposed between said pairs of wheels and having a motor on one of said sections driving said pairs of wheels through connections including a shaft having a universal joint so disposed with respect to said pivot that the driving connections are not disturbed by pivotal movement of the sections about said pivot; a member secured to one of said sections and disposed concentrically to said pivot, a steering shaft on the other of said sections and having means to move said member about the axis of said pivot and thereby to cause a pivotal movement of one section with respect to the other, a connection from said motor to said steering shaft comprising normally inoperative clutches adapted to rotate said steering shaft in opposite directions, a steering wheel normally inoperative to steer the tractor, means to render one of said clutches operative upon turning the steering wheel in one direction and means to render the other clutch operative upon turning the steering wheel in the opposite direction.

3. In a motor-driven tractor having front and rear sections, each carrying a pair of wheels and pivoted together on a vertical pivot disposed between said pairs of wheels and having a motor on one of said sections driving said pairs of wheels through connections including a shaft having a universal joint so disposed with respect to said pivot that the driving connections are not disturbed by pivotal movement of the sections about said pivot; a member secured to one of said sections and disposed concentrically to said pivot, a steering shaft on the other of said sections and having means to move said member about the axis of said pivot and thereby to cause a pivotal movement of one section with respect to the other, a connection from said motor to said steering shaft comprising normally inoperative clutches adapted to rotate said steering shaft in opposite directions, a steering wheel normally inoperative to steer the tractor, means to render one of said clutches operative upon turning the steering wheel in one direction, means to render the other clutch operative upon turning the steering wheel in the opposite direction, each of said clutches comprising driving and driven elements, and means yieldingly holding said elements out of engagement to maintain said clutches normally inoperative.

NORMAN C. STOREY.